Jan. 7, 1941.  E. W. LA VEZZI  2,227,592
MOTION PICTURE PROJECTOR SHUTTER
Filed July 11, 1940  2 Sheets-Sheet 1
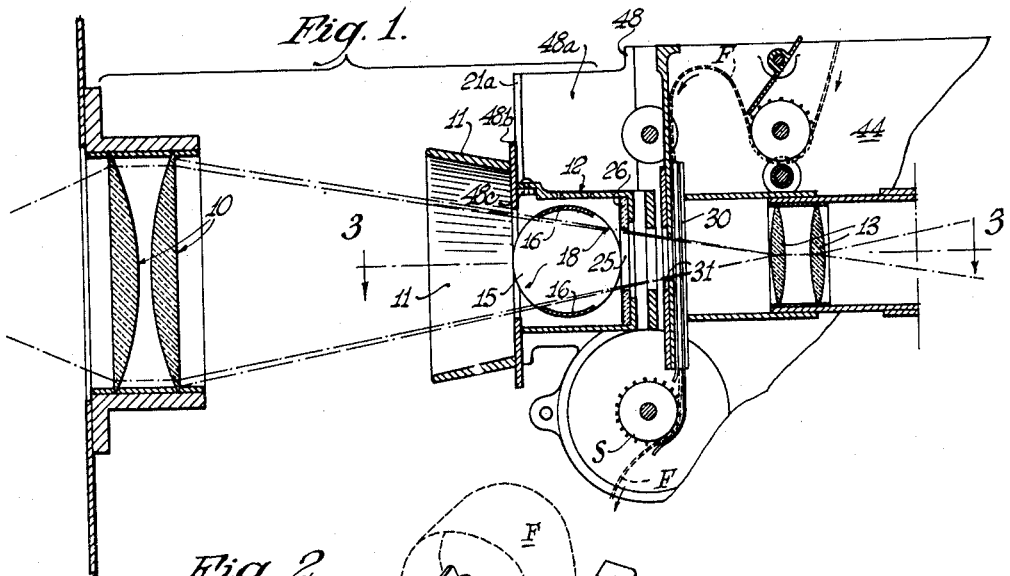
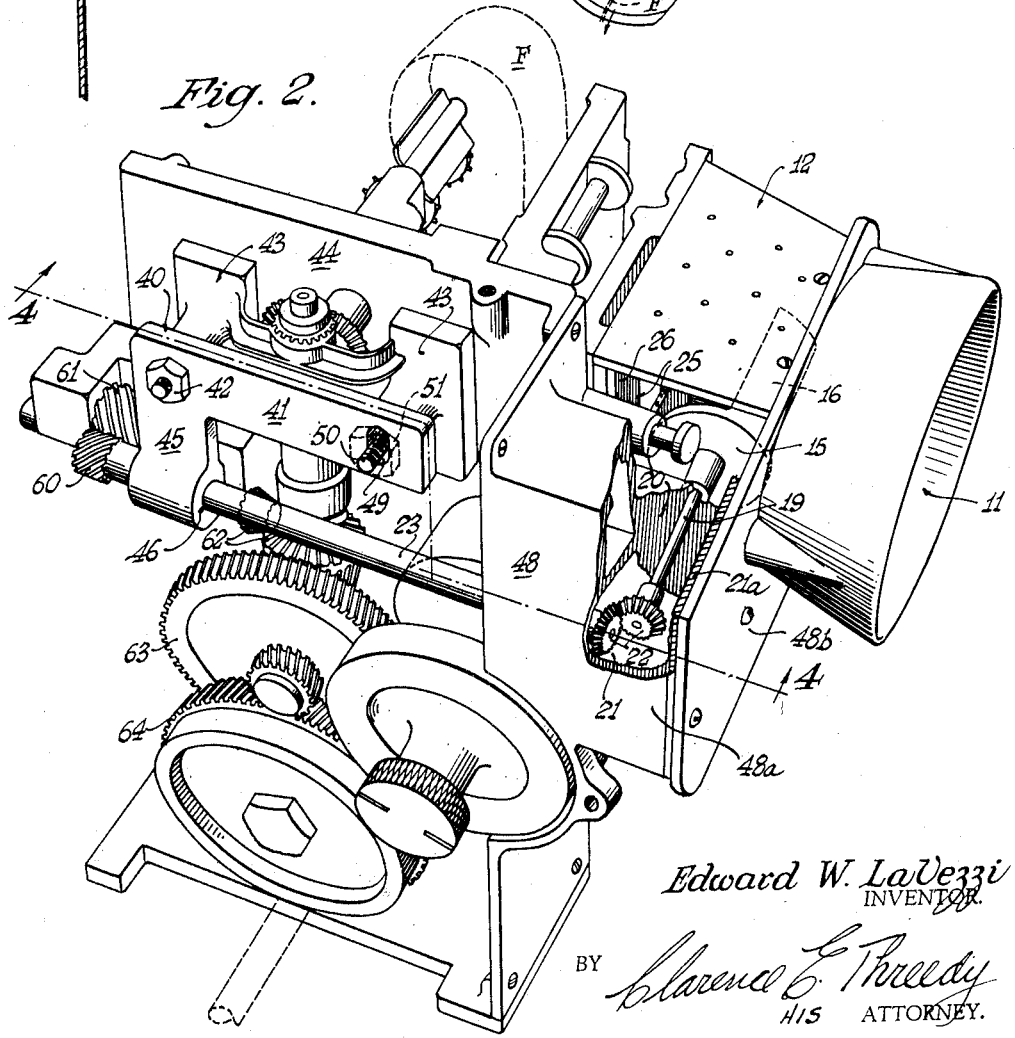
Edward W. LaVezzi
INVENTOR.
BY Clarence E. Threedy
HIS ATTORNEY.

Jan. 7, 1941. E. W. LA VEZZI 2,227,592
MOTION PICTURE PROJECTOR SHUTTER
Filed July 11, 1940   2 Sheets-Sheet 2
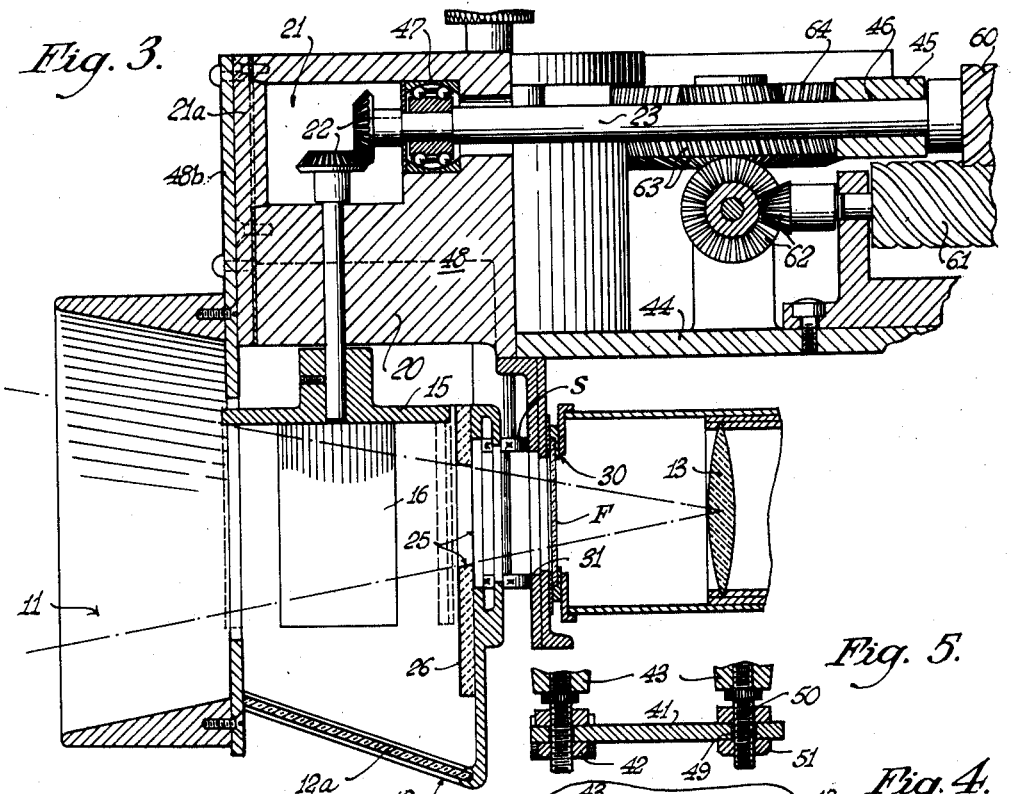
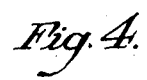
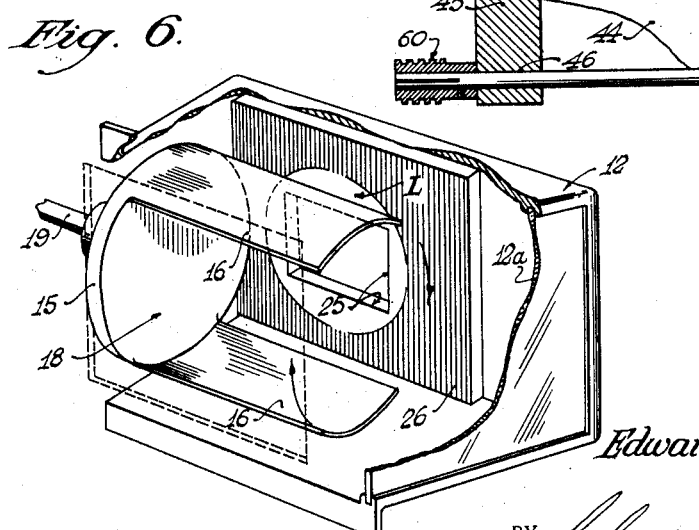
Edward W. La Vezzi
INVENTOR.
BY Clarence E. Threedy
HIS ATTORNEY.

Patented Jan. 7, 1941

2,227,592

UNITED STATES PATENT OFFICE 2,227,592

MOTION PICTURE PROJECTOR SHUTTER

Edward W. La Vezzi, Chicago, Ill.

Application July 11, 1940, Serial No. 344,862

6 Claims. (Cl. 88—19.3)

This invention relates to motion picture projectors and more particularly to the shutter mechanism thereof, one of the principal objects being the provision of improved shutter means of the barrel type for use with projectors of the so-called Simplex type which include a viewing chamber or light shield.

More particularly stated, it is an object of the invention to provide improved shutter means including a barrel type shutter of reduced size and mass, which reduces danger of injury to the accurately timed driving gears in the event of a sudden stoppage.

A further object is the arrangement of a barrel type shutter in the viewing chamber where it will be close to the film and result in an increase of the effective intensity of the illumination at the aperture.

Still another object is the provision of a compact shutter attachment to replace prior shutter devices with the object of eliminating noise and vibration which are highly objectionable where sound equipment is employed with the projector.

Other objects, advantages and novel aspects of the invention reside in certain details of construction as well as the cooperative relationship of the component parts of the illustrative embodiment described hereinafter in view of the annexed drawings, in which:

Fig. 1 is a fragmentary vertical section through the film feed unit of a projector of the Simplex type.

Fig. 2 is a perspective view of the film feed unit;

Fig. 3 is a fragmentary horizontal section through the film feed unit along lines 3—3 of Fig. 1;

Fig. 4 is a vertical section through the adjustable hanger bracket for the shutter drive shaft, looking in the direction of lines 4—4 of Fig. 2;

Fig. 5 is a sectional detail along lines 5—5 of Fig. 4;

Fig. 6 is a perspective fragment of the viewing chamber and shutter therein.

In motion picture projectors of the class with which this invention is especially intended to be used, there is included, as shown in Fig. 1, a light condenser including a system of lenses 10, which converges rays from a light source (coming from the left) through a cone 11 and a viewing chamber 12, thence through the film and a system of objective lenses 13 by which the image is projected onto the screen. Heretofore it has been the practice to employ a shutter of either the barrel type or the disc type in the region between the condensing lenses 10 and the light cone 11.

In accordance with the present invention, the shutter is removed from the region between the condenser and cone and placed in the viewing chamber 12, a change which is attended by numerous advantages hereinafter to appear.

The construction of the barrel shutter, as employed in the novel arrangement, is substantially the same as that heretofore used, with the notable exception that according to the invention the shutter is considerably reduced in size and also in mass.

As shown in Figs. 3 and 6 particularly, the barrel shutter includes a base disc 15 on diametrically opposite sides from which extends a pair of curved shutter plates 16, the latter being integral with or attached to the base disc 15, the space 18 intervening between the pair of plates constituting the shutter aperture (Fig. 1), through which light may freely pass when the shutter plates are in vertical alignment as shown in Figs. 1, 3 and 6.

The base disc of the shutter is carried on a stud shaft 19 journaled in a special bushing 20 (Fig. 2 particularly) formed as a part of the unit base or mounting plate 48 at one side of the viewing chamber. Constituting a part of the mounting plate 48 is an integral chamber portion 21 adapted to provide a grease chamber, which encloses a pair of bevel gears 22 by means of which the shutter shaft is drivingly coupled to an intermediate drive shaft 23 ultimately connecting with the main drive.

As shown in Figs. 3 and 6 particularly, the viewing chamber 12 is provided at one side with a darkened window 12a by means of which the operator can peer into the chamber and observe the position of the spot of light, indicated at L (Fig. 6), with relation to an aperture 25 in an inner asbestos frame element 26, the light being adjusted and centered relative to the aperture and the film in effecting proper projection. Heretofore the viewing chamber 12 has served no other purpose than that just described and was occupied by no mechanism save the aperture member 26 or an equivalent device. In accordance with the present invention, the otherwise unutilized space within the chamber is occupied by a smaller barrel shutter which does not interfere with the centering of the light beam, provided the shutter is turned into the position shown in Fig. 6, an act which is quickly and very easily done.

It will be apparent from an examination of Fig. 1 that the relative size of a shutter positioned between the condensing lenses 10 and light cone 11, would be considerably greater than that of the shutter 15—16 disposed in the viewing chamber 12, since the light rays are converging at a fairly sharp angle toward the aperture 25 and the projecting lenses. Since the shutter 15—16 is itself smaller and its speed of rotation is substantially unchanged, the mass of the moving parts of the shutter is very considerably reduced, with a consequent reduction in the load on the driving means and a consequent lessening in the kinetic energy stored in the shutter, compared to the larger style shutter heretofore used, so that sudden stoppage of the moving system cannot result in damage to the driving gear for the shutter, which would result, for example, from a sudden stoppage of the shutter drive shaft 23. This latter danger exists in the previously known structure employing the larger shutter between the condenser and cone.

Another distinct advantage of the improvement resides in the fact that the intensity of illumination at the aperture is greatly increased, and this is an important factor in efficient projection. The reason for the increase is not at this time wholly understood, it being thought that one of the contributing factors to this increase relates to the reduction of possible dispersion and a form of aberration, owing to the smaller overall size of the shutter vanes or plates 16 and the relatively reduced peripheral speed thereof in cutting into and out of the light stream. Tests with photo-electric light meters indicate an increase in intensity of illumination at the aperture measuring as high as thirty per cent, and averaging about twenty per cent, over that measured when the larger old-type blade shutter is employed.

Referring to Figs. 1 and 3, it is pointed out that in a projector of the class described, the film gate 30, behind which the film F is threaded, is placed close against the main aperture 31, which is spaced slightly from the aperture 25 in the viewing chamber, the spacing between the main aperture and the aperture in the viewing chamber being necessary on standard equipment, so that the positioning of the improved shutter relative to the film passage is as close as practically possible without altering the design of the machine. It will be understood that the advantages of the invention can be further enlarged by placement of the shutter still closer to the film gate and channel, it being the purpose of the present description to illustrate one application of the invention to a standard type of projector without substantial structural changes in said projector. In the appended claims it will be understood that reference to the placement of the barrel shutter close to the aperture will refer both to the aperture 25 in the viewing chamber and the main aperture 31 opposite the gate.

Another improvement of the invention resides in the driving connection from the main drive to the shutter and particularly to the provision of an adjustable journal bracket 40 (Fig. 2) consisting of a horizontal arm 41 pivotally bolted as at 42 to a stand-off bracket 43 fixed on a partition 44 of the unit, the journal bracket further including arm 45 extending at right angles to the first-mentioned arm and provided with a bore 46 in which one end of the drive shaft 23 is journaled. The opposite end of the drive shaft 23 (Figs. 3 and 4) is journaled in a rockably mounted bearing 47 seated in a block 48 of the unit for movement in a plane including the shaft 23. As a result of this arrangement the journal bracket 40 may be rocked about the bolt means 42 as a pivot, the opposite end of the main horizontal arm 41 of the bracket being provided with a transverse slot 49 (Fig. 4 particularly) through which projects a threaded stud 50 from one of the bosses on the stand-off bracket 43. A nut 51 (Figs. 2 and 5) is turned onto the threaded stud to secure the journal bracket arm 41 in positions of adjustment, such adjustment being particularly desirable to effect a ready lining up of the shaft and the driving pinions therefor, particularly where the improved shutter structure is to be applied as an attachment to a machine of the class described. This arrangement obviates machining and mechanical troubles under such circumstances.

Another feature of improvement relates to the construction of the mounting plate 48 which forms a base and journal for the attachment herein disclosed, said plate 48 being provided with a block 48a in which is formed the oil well or grease chamber generally indicated at 21, the open side of the chamber 21 being closed by a plate 21a which is mounted over the face of the block 48 by means of screws and being sealed by an adequate gasket. A vertically disposed plate 48b is carried by said mounting plate 48, flush with the plate 21a, and provides a mounting or carriage for the light cone 11 and the light shield or viewing chamber 12. The plate 48b is provided with tapered lugs 48c to which the top wall 12b of the light shield is screwed.

The end of the drive shaft 23 opposite the bevel gears in the grease chamber 21 is provided with gear means 60 meshing with a driving gear 61 driven through pinions 62 from a main intermediate gear 63 and a main driving gear 64. The gears 61—62—63 are formed and constructed of a fiber material known to the trade as "Formica."

The manipulation of the projector equipped with the improved shutter means is substantially unchanged, the operator threading the film behind the gate 30 in front of the main aperture 31 in the customary manner for engagement and movement by an intermittent feeding sprocket S (Fig. 1). The light from a source to the left of the unit of Fig. 1 is concentrated and focused through the cone 11 and the viewing chamber 12 onto the aperture 25, the operator manually displacing a framing knob (not shown) to effect movement of the shutter 15—16 into the position shown in Fig. 1, so that he may observe the position of the light beam L through the viewing window 12a and position the beam properly with respect to the aperture 25 (and hence with the main aperture 31). When the machine is otherwise ready for operation and the driving gear operating, the shutter will be rotated at high speed to interrupt the light beam completely during movements of the film from one frame to the next in the customary manner.

The introduction of sound apparatus operating in conjunction with present day projectors necessitate a more smoothly running and a quieter operation of the entire driving gear. The attachment herein disclosed provides a unitary structure less cumbersome to handle, with the result that instead of sending the entire unit out of the theater for repairs or adjustments, the matter becomes a local problem which can be easily handled by the operator himself. Further the light-weight construction of the various parts makes for considerably reduced wear on the drive gears and motor, and the bevel gears 22 being confined in the grease or oil chamber 21 require less frequent lubrication and run with a minimum of noise. Moreover, as a result of the compact construction of the entire unit, vibration is also minimized.

The various advantages and objects of the invention may be accomplished by modifications of the particular embodiments specifically described herein, and it is intended that the appended claims shall include all equivalent arrangements fairly coming within their call.

Having thus described my invention, what I claim as new and desire to protect by Letters Patent is:

1. In a motion picture projector including a main driving gear and a shutter to be driven thereby, a driving shaft for said shutter, means drivingly interconnecting said shaft and shutter, means for adjustably journaling said driving shaft and including a rockable bearing in which said shaft is seated in a region near one of its ends, and means for journaling an opposite end portion of said shaft and including a bracket pivotally supported for movement about an axis transverse to the axis of rotation of said shaft, pin and slot means at a portion of said bracket remote from the pivotal mounting thereof, and means cooperating with said pin and slot means for fixing said bracket in positions into which it has been adjusted by pivotal movement, said bracket including a portion offset from said pivotal mounting and pin and slot means and supportably engaging an end portion of said shaft remote from said rockable bearing, and means drivingly interconnecting said shaft with said driving gear.

2. In a motion picture machine, means for adjustably journaling a shutter shaft and comprising a bearing mounted for rocking motion in a direction transverse to the length of said shaft and rotatably supporting one end portion of said shaft, and a hanger bracket including a main arm portion having an angularly projecting arm portion, means pivotally mounting said bracket near the juncture of said arm portions thereof for adjusting movement in substantially the same directions as said bearing, said angularly projecting arm being provided with means journaling said shaft at a point remote from said bearing, and means cooperating with said main arm at a point remote from the pivotal mounting thereof for securing the same in positions of adjustment, whereby said shaft may be adjustably rocked with respect to said bearing as the center of rocking motion.

3. In a motion picture projector, a shutter assembly adapted for mounting as a part of the projecting unit near the light aperture and film gate, said mechanism comprising a journal block mounted on said unit and including a hollow portion constituting a grease chamber, a shutter shaft journaled in said bracket and communicating at one end into said chamber and having an opposite end portion engaged with a rotatable shutter element disposed in the path of light directed toward said aperture and gate for projection purposes, a cover plate removably fitted on said block to close said chamber, means on said plate defining a viewing chamber with light openings registering with said aperture and through which light projected as aforesaid is directed onto the film in said gate, said shutter being housed in said viewing chamber, and a driving shaft communicating into said grease chamber and connected by pinion means with said shutter shaft to drive the latter.

4. In a motion picture projector, a shutter assembly adapted for mounting as a part of the projecting unit near the light aperture and film gate, said mechanism comprising a journal block mounted on said unit and including a hollow portion constituting a grease chamber, a shutter shaft journaled in said bracket and communicating at one end into said chamber and having an opposite end portion engaged with a rotatable shutter element disposed in the path of light directed toward said aperture and gate for projection purposes, a cover plate removably fitted on said block to close said chamber, means on said plate defining a viewing chamber with light openings registering with said aperture and through which light projected as aforesaid is directed onto the film in said gate, said shutter being housed in said viewing chamber, a driving shaft communicating into said grease chamber and connected by pinion means with said shutter shaft to drive the latter, and means on said cover plate defining a light cone through which light is directed into the viewing chamber and toward the film as aforesaid.

5. In a motion picture projector, shutter mechanism adapted for mounting as a part of a projecting unit including a film gate aperture through which light is directed from a source onto the film for projecting purposes, said mechanism comprising a journal block mounted on said unit and having a hollow portion constituting a grease chamber, said block being mounted at one side of said aperture and the path of projection of light through the latter, a shutter shaft journaled in said block to extend in a direction transversely of the path of light projected as aforesaid, one end of said shaft terminating in said grease chamber, said end being provided with a driven pinion, a rotatable shutter element rigid with the other end of said shaft and adapted to be rotated by the latter to interrupt light projected as aforesaid, means providing a viewing chamber enclosing said shutter, said viewing chamber including light apertures aligned with said first-mentioned aperture to permit passage of light projected as aforesaid through the shutter and film, a driving shaft journaled near one end in a bearing mounted on said block for rocking movement about an axis transverse to said driving shaft, one end of said driving shaft terminating in pinion means drivingly connected with said pinion means on the shutter shaft in said grease chamber, said driving shaft being journaled at a point remote from said bearing and grease chamber for adjusting movement about the rocking axis of said bearing.

6. In a motion picture projector, a shutter mechanism comprising a journal block adapted to be mounted adjacent the light aperture of the projecting unit, said block having a hollow portion constituting a grease receptacle, a shutter shaft journaled in said block to extend transversely of the direction of projection of light toward said aperture, a barrel type shutter driven by said shutter shaft to interrupt light projected as aforesaid, means providing a viewing chamber housing said shutter closely adjacent said aperture, a driving shaft extending at right angles to said shutter shaft and having one end journaled in a bearing arranged in said block to rock about an axis approximately parallel with that of the shutter shaft and adjustable bearing means adjacent an opposite end of said driving shaft from said rockable bearing and permitting adjusting movements of the driving shaft about the axis of rocking movement of said bearing, said driving shaft projecting into said grease receptacle, and pinion means drivingly interconnecting said last-mentioned end of the driving shaft and shutter shaft.

EDWARD W. LA VEZZI.